US012582205B2

(12) United States Patent
Jang

(10) Patent No.: US 12,582,205 B2
(45) Date of Patent: Mar. 24, 2026

(54) WALKING ASSISTANCE METHOD AND APPARATUSES

(71) Applicant: Samsung Electronics Co., Ltd., Suwon-si (KR)

(72) Inventor: Jun-Won Jang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1352 days.

(21) Appl. No.: 17/317,108

(22) Filed: May 11, 2021

(65) Prior Publication Data

US 2021/0259374 A1 Aug. 26, 2021

Related U.S. Application Data

(63) Continuation of application No. 15/405,733, filed on Jan. 13, 2017, now Pat. No. 11,013,302.

(30) Foreign Application Priority Data

Sep. 5, 2016 (KR) ........................ 10-2016-0113972

(51) Int. Cl.

*A61H 1/00* (2006.01)
*A45B 9/00* (2006.01)
*A61H 1/02* (2006.01)
*A61H 3/00* (2006.01)
*A61H 3/02* (2006.01)

(52) U.S. Cl.

CPC ................. *A45B 9/00* (2013.01); *A61H 1/02* (2013.01); *A61H 1/0237* (2013.01); *A61H 3/00* (2013.01); *A61H 3/02* (2013.01); *A45B 2009/002* (2013.01); *A45B 2009/007* (2013.01); *A61H 2201/1642* (2013.01); *A61H 2201/165* (2013.01); *A61H 2201/50* (2013.01); *A61H 2201/5007* (2013.01); *A61H 2201/5035* (2013.01); *A61H 2201/5041* (2013.01); *A61H 2201/5069* (2013.01); *A61H 2201/5079* (2013.01); *A61H 2201/5084* (2013.01)

(58) Field of Classification Search

CPC .................................... A61H 1/00; A61H 1/02
See application file for complete search history.

(56) References Cited

U.S. PATENT DOCUMENTS

| | | | |
|---|---|---|---|
| 2013/0237884 A1 | 9/2013 | Kazerooni et al. |
| 2013/0261513 A1 | 10/2013 | Goffer et al. |
| 2014/0053887 A1 | 2/2014 | Lee |
| 2014/0358290 A1 | 12/2014 | Kazerooni et al. |
| 2016/0016309 A1 | 1/2016 | Swift et al. |
| 2018/0296426 A1 | 10/2018 | Kappel |

FOREIGN PATENT DOCUMENTS

| | | |
|---|---|---|
| KR | 10-0802533 B1 | 2/2008 |
| KR | 10-2011-0074170 A | 6/2011 |
| KR | 10-1471856 B1 | 12/2014 |

OTHER PUBLICATIONS

Korean Office Action issued by Korean Intellectual Property Office (KIPO) on Nov. 30, 2022 for the corresponding KR Patent Application No. 10-2016-0113972.

*Primary Examiner* — LaToya M Louis
(74) *Attorney, Agent, or Firm* — Harness, Dickey & Pierce, P.L.C.

(57) ABSTRACT

A walking assistance apparatus is configured to adaptively control at least one of a length or a stiffness based on a gait motion of a user to assist an upper body of the user.

16 Claims, 13 Drawing Sheets

WALKING ASSISTANCE METHOD AND APPARATUSES

CROSS-REFERENCE TO RELATED APPLICATION

This application is a continuation of U.S. application Ser. No. 15/405,733, filed on Jan. 13, 2017, which claims priority under 35 U.S.C. § 119 to Korean Patent Application No. 10-2016-0113972, filed on Sep. 5, 2016, in the Korean Intellectual Property Office, the entire contents of each of which are incorporated herein by reference in their entirety.

BACKGROUND

1. Field

At least one example embodiment relates to a walking assistance method and/or apparatuses.

2. Description of the Related Art

With the onset of rapidly aging societies, many people may experience inconvenience and pain from joint problems, and interest in motion assistance apparatuses enabling the elderly or patients with joint problems to walk with less effort, may increase. Furthermore, motion assistance apparatuses for intensifying muscular strength of human bodies may be useful for military purposes.

The user may use a cane or a crutch and receive a gait assistance from a motion assistance apparatus during walking. When the user ascends or descends stairs, despite the gait assistance of the motion assistance apparatus, the cane or the crutch having a fixed length may upset a balance, which may lead to an accident during the walking.

SUMMARY

Some example embodiments relate to a walking assistance apparatus.

In some example embodiment, the walking assistance apparatus may include a control device configured to adaptively control at least one of a length and a stiffness of the walking assistance apparatus based on a gait motion of a user to assist an upper body of the user.

Other example embodiments relate to a walking assistance method.

In some example embodiments, the walking assistance method may include acquiring information on a gait motion of a user; and adaptively controlling at least one of a length or a stiffness of a walking assistance apparatus to assist an upper body of the user based on the gait motion.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
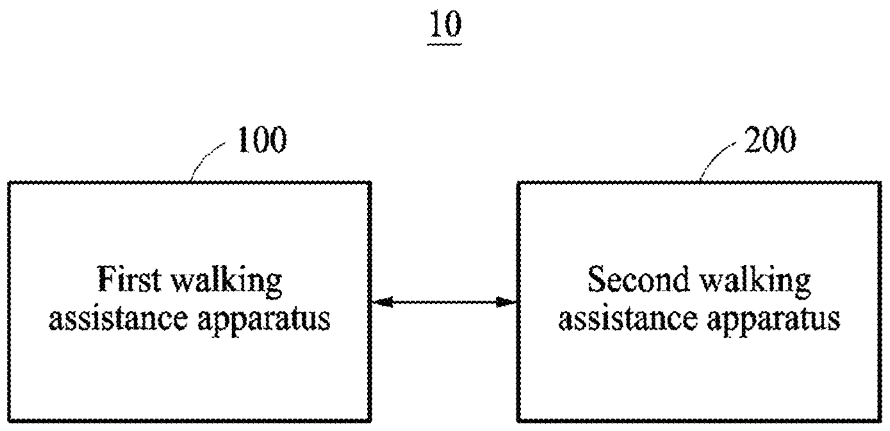
FIG. 1 is a block diagram of a walking assistance system according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is “connected”, “coupled”, or “joined” to another component, a third component may be “connected”, “coupled”, and “joined” between the first and second components, although the first component may be directly connected, coupled or joined to the second component.

The terminology used herein is for the purpose of describing particular embodiments only and is not intended to be limiting. As used herein, the singular forms “a,” “an,” and “the,” are intended to include the plural forms as well, unless the context clearly indicates otherwise. It will be further understood that the terms “comprises,” “comprising,” “includes,” and/or “including,” when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 2:
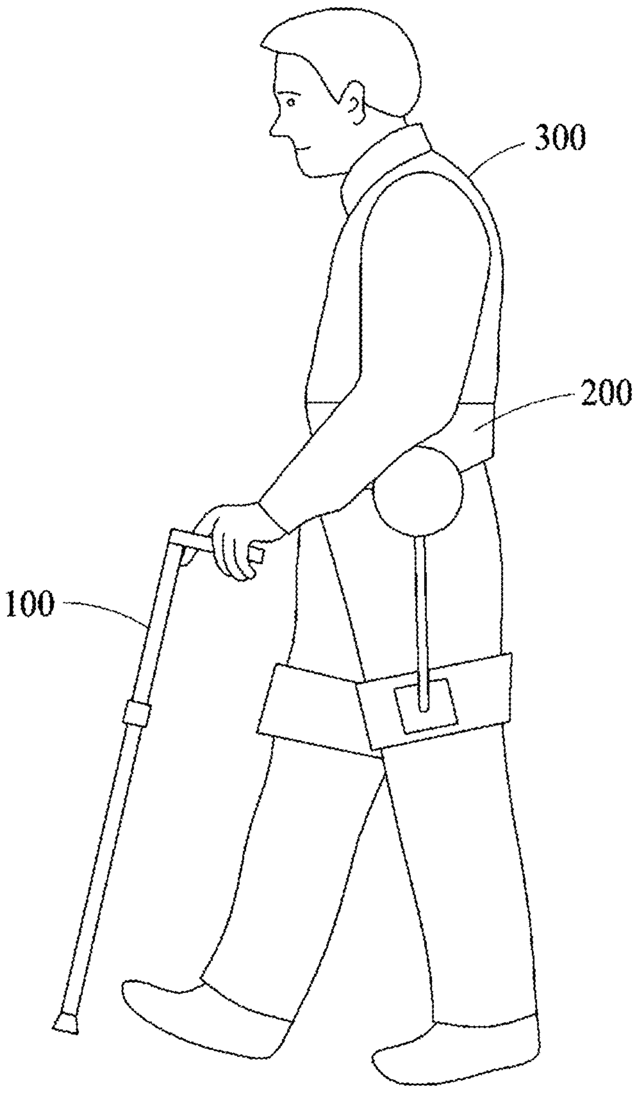
FIG. 2 is a diagram illustrating a user assisted in walking by a first walking assistance apparatus and a second walking assistance apparatus of FIG. 1.

FIG. 1 is a block diagram of a walking assistance system according to at least one example embodiment, and FIG. 2 is a diagram illustrating a user assisted in walking by a first walking assistance apparatus and a second walking assistance apparatus of FIG. 1.

Referring to FIGS. 1 and 2, a walking assistance system 10 may include a first walking assistance apparatus 100 and a second walking assistance apparatus 200. In the present disclosure, the term "walking" may be interchangeably used with the term "gait"

The first walking assistance apparatus 100 and the second walking assistance apparatus 200 may be worn by a target body, for example, a user 300, to assist a gait and/or a motion of the user 300. The target of object may be, for example, a person, an animal, or a robot, and an example of the target body is not limited thereto.

The first walking assistance apparatus 100 may be in contact with a portion of an upper body of the user 300 to assist the upper body of the user 300 while the user 300 is moving and/or walking. The first walking assistance apparatus 100 may be implemented as, for example, a cane and a crutch.

The first walking assistance apparatus 100 may adaptively control at least one of a length or a stiffness of the first walking assistance apparatus 100 based on a gait motion of the user 300 to assist the upper body of the user 300 while the user 300 is walking. The gait motion may include a level walking motion, an ascending walking motion, for example, a walking step-up, a descending walking motion, for example, a walking step-down, and a standing motion.

The first walking assistance apparatus 100 may acquire information on the gait motion of the user 300 from the second walking assistance apparatus 200. The first walking assistance apparatus 100 and the second walking assistance apparatus 200 may communicate with each other. For example, the first walking assistance apparatus 100 and the second walking assistance apparatus 200 may communicate with each other through wired or wireless communication. The wired communication may be a communication using a wired local area network (LAN) or a universal serial bus (USB) port, for example, USB 2.0 and USB 3.0. The wireless communication may be, for example, an Internet communication, an intranet, Bluetooth, a wireless LAN, and a wireless fidelity (WiFi) based on the Institute of Electrical and Electronics Engineers (IEEE) 802.11.

In some example embodiments, the second walking assistance apparatus 200 may be in contact with a portion of a lower body of the user 300 to assist the lower body of the user 300 while the user 300 is moving and/or walking. The second walking assistance apparatus 200 may assist a gait and/or a motion of, for example, a foot, a calf, a thigh, or another part of the lower body of the user 300 so as to directly assist the lower body of the user 300.

In other example embodiments, the second walking assistance apparatus 200 may be a passive device that senses the gait motion of the user 300 and provide the same to the first walking assistance apparatus 100 without also assisting the gait of the user 300.

The second walking assistance apparatus 200 may detect a landing time of a foot of the user 300 and detect a gait motion based on left-and-right hip joint angle information of the user 300 at the landing point in time. The second walking assistance apparatus 200 may detect the gait motion of the user 300 using the left-and-right hip joint angle information of the user 300 at one stepping point in time.

The first walking assistance apparatus 100 may adaptively control at least one of the length or the stiffness of the first walking assistance apparatus 100 based on a gait environment or a gait task to directly assist the upper body of the user 300. By assisting the upper body of the user 300, the first walking assistance apparatus 100 may indirectly assist the lower body of the user 300. While the second walking assistance apparatus 200 provides a gait assistance to the lower body of the user 300, the first walking assistance apparatus 100 may allow the user 300 to maintain a balance in various gait environments and thus, the user 300 may be appropriately assisted in walking based on the gait environments. Also, the user 300 may be prevented from an accident which may occur in the various gait environments.

FIG. 2 illustrates the first walking assistance apparatus 100 as, for example, a cane-type walking assistance apparatus, contacting a hand of the user to assist the upper body of the user 300, and also illustrates the second walking assistance apparatus 200 as, for example, a hip-type walking assistance apparatus, operating on a thigh of the user 300. However, the type of the first walking assistance apparatus 100 and the type of the second walking assistance apparatus 200 are not limited thereto.

Referring to FIG. 2, the first walking assistance apparatus 100 may be in contact with a portion of or the entire upper body, for example, a hand, an upper arm, or a lower arm of the user 300 to assist the upper body of the user 300. Also, the second walking assistance apparatus 200 may be in contact with a portion of or the entire lower body, for example, a foot, or a calf of the user 300 to assist the lower body of the user 300. The second walking assistance apparatus 200 may be applicable to, for example, a walking assistance apparatus that supports an entire pelvic limb, a walking assistance apparatus that supports a portion of a pelvic limb, and the like. The walking assistance apparatus that supports a portion of a pelvic limb may be applicable to, for example, a walking assistance apparatus that supports up to a knee, or a walking assistance apparatus that supports up to an ankle.

Figure 3:
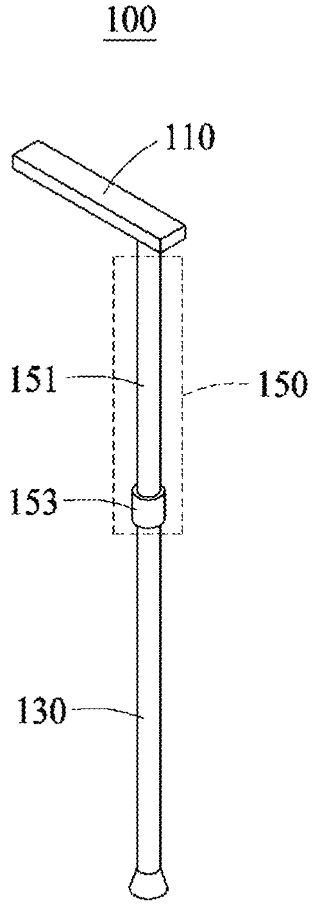
FIG. 3 is a side view of the walking assistance apparatus of FIG. 1.
Figure 4:
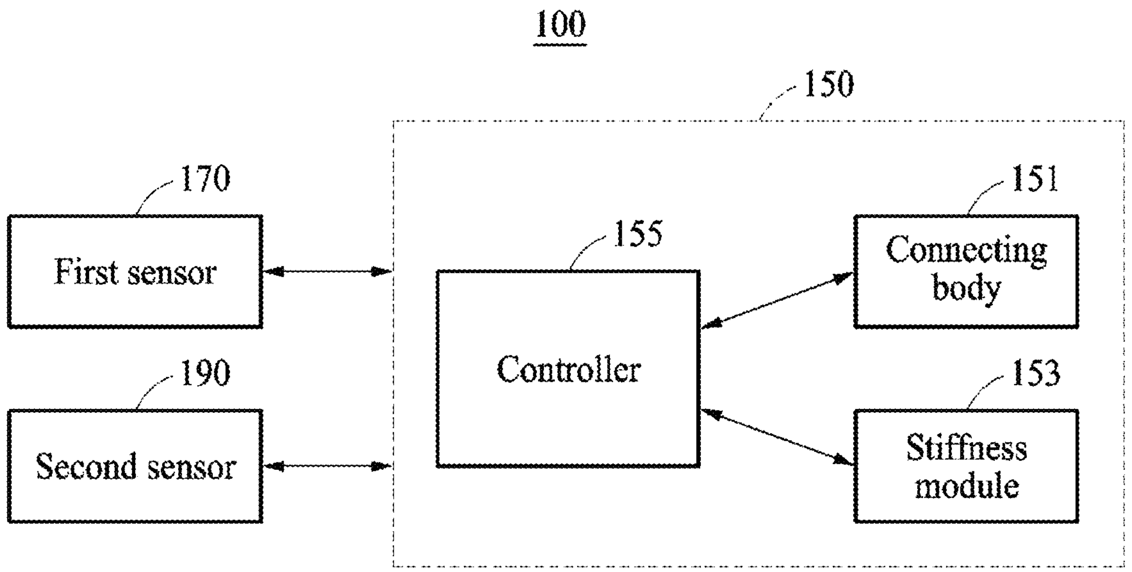
FIG. 4 is a block diagram of a first walking assistance apparatus of FIG. 3.
Figure 5:
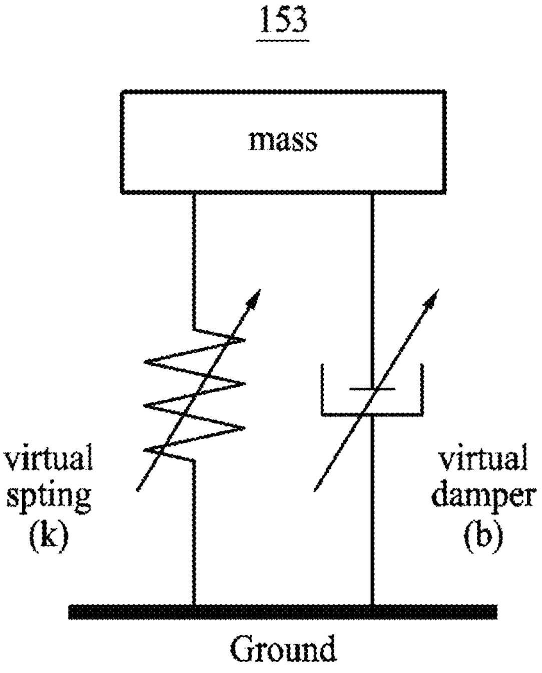
FIG. 5 is a diagram illustrating an operation of changing a stiffness of a stiffness module of FIG. 4.

FIG. 3 is a side view of the walking assistance apparatus of FIG. 1, FIG. 4 is a block diagram of a first walking assistance apparatus of FIG. 3, and FIG. 5 is a diagram illustrating an operation of changing a stiffness of a stiffness module of FIG. 4.

Referring to FIGS. 3 through 5, the first walking assistance apparatus 100 may include an upper body support 110, a lower body support 130, and a control device 150. The first walking assistance apparatus 100 may further include sensors, for example, a first sensor 170 and a second sensor 190.

The upper body support 110 may be in contact with a portion of an upper body of the user 300, for example, a hand, an elbow, or an armpit. For example, the upper body support 110 may be in a form grabbed by a portion of the upper body of the user 300 or a form on which the user 300 leans a portion of the upper body. The upper body support 110 may be provided in a form of a handle and/or a cradle.

The lower body support 130 may be in contact with a ground to support or hold the user 300. For example, the lower body support 130 may bear a weight of the user 300 delivered through the upper body support 110. Also, the lower body support 130 may include an empty space or a hollow through which a connecting body 151 of the control device 150 vertically moves in a longitudinal direction.

The control device 150 may connect the upper body support 110 and the lower body support 130 and adaptively control at least one of a length or a stiffness of the first walking assistance apparatus 100 based on a gait motion. The control device 150 may include the connecting body 151, a stiffness module 153, and a controller 155.

The connecting body 151 may be electrically adjustable in length between the upper body support 110 and the lower body support 130 under a control of the controller 155. For example, the controller 155 may control the connecting body 151 to vertically move in a longitudinal direction through the empty space in the lower body support 130 such that a length of the connecting body 151 is adjusted between the upper body support 110 and the lower body support 130. In this example, the controller 155 may control the connecting body 151 using a driving device such as a spring and/or a motor to vertically move in the longitudinal direction.

The stiffness module 153 may provide a stiffness to assist a power for supporting or bearing the user 300. The power for supporting or bearing the user 300 may also be referred to as a supporting power. As illustrated in FIG. 5, the stiffness of the stiffness module 153 may be modeled based on a virtual spring and/or a virtual damping, or a virtual damper.

For example, the stiffness module 153 may be implemented through a spring device and/or a damping device. Also, the stiffness of the stiffness module 153 may be controlled in response to an impedance being changed based on changes in a spring constant and a damping constant under the control of the controller 155.

The connecting body 151 and the stiffness module 153 may be implemented to separate from each other and also be implemented in an integrated form. Also, each of the connecting body 151 and the stiffness module 153 may be implemented as a passive form or an active form. For example, the connecting body 151 and the stiffness module 153 may be integrally formed as a linear actuator and an oil pressure gauge.

The controller 155 included in the first walking assistance apparatus 100 may include any device capable of processing data including, for example, an application application-specific integrated circuit (ASIC) configured to carry out specific operations based on input data, or a microprocessor configured as a special purpose processor by executing instructions included in computer readable code. The computer readable code may be stored on, for example, a memory (not shown). As discussed in more detail below, the computer readable code may configure the controller 155 as a special purpose controller to adaptively control at least one of a length and a stiffness of the walking assistance apparatus 100 based on a gait motion of a user to assist an upper body of the user.

The controller 155 may control an overall operation of the control device 150. For example, the controller 155 may control the connecting body 151 and the stiffness module 153.

The controller 155 may adjust the length of the connecting body 151 before the user 300 starts walking such that the first walking assistance apparatus 100 is located at an appropriate position of a body of the user 300.

For example, in response to a user input received through a button (not shown), the controller 155 may adjust the length of the connecting body 151 before the user 300 starts walking. The controller 155 may adjust the length of the connecting body 151 in response to a manual operation of the user 300. The button (not shown) may be located on the upper body support 110 such that the controller 155 can automatically sense when the user 300 grips the first walking assistance device 100 and adjust the length of the connecting body 151 to an initial position.

Also, the controller 155 may automatically adjust the length of the connecting body 151 based on whether the lower body support 130 is in contact the ground and a distance between the lower body support 130 and the ground. For example, when a distance between a lower end of the lower body support 130 and the ground is in a desired (or, alternatively, a predetermined) range, the controller 155 may start an adjustment of the length of the connecting body 151 based on distance information transmitted from the first sensor 170. The controller 155 may suspend the adjustment at a point in time at which the lower end of the lower body support 130 contacts the ground based on touch information transmitted from the second sensor 190.

Thereafter, the controller 155 may control the length of the connecting body 151 and the stiffness of the stiffness module 153 based on a gait motion. For example, the controller 155 may adaptively adjust the length of the connecting body 151 and change the stiffness of the stiffness module 153 based on a phase of the gait motion. The phase may indicate a phase for each step in the gait motion.

The first walking assistance apparatus 100 may be maintained to be at the appropriate position of the body of the user 300 based on the phase of the gait motion. Also, a power of the first walking assistance apparatus 100 supporting the user 300 may be maintained based on the phase of the gait motion.

The first sensor 170 may generate the distance information by sensing the distance between the lower end of the lower body support 130 and the ground and transmit the distance information to the controller 155. The first sensor 170 may be, for example, a distance measurement sensor.

The second sensor 190 may generate the touch information by sensing whether the lower end of the lower body support 130 touches the ground and transmit the touch information to the controller 155. The second sensor 190 may be, for example, a touch sensor, a force sensor or an optical sensor.

Figure 6A:
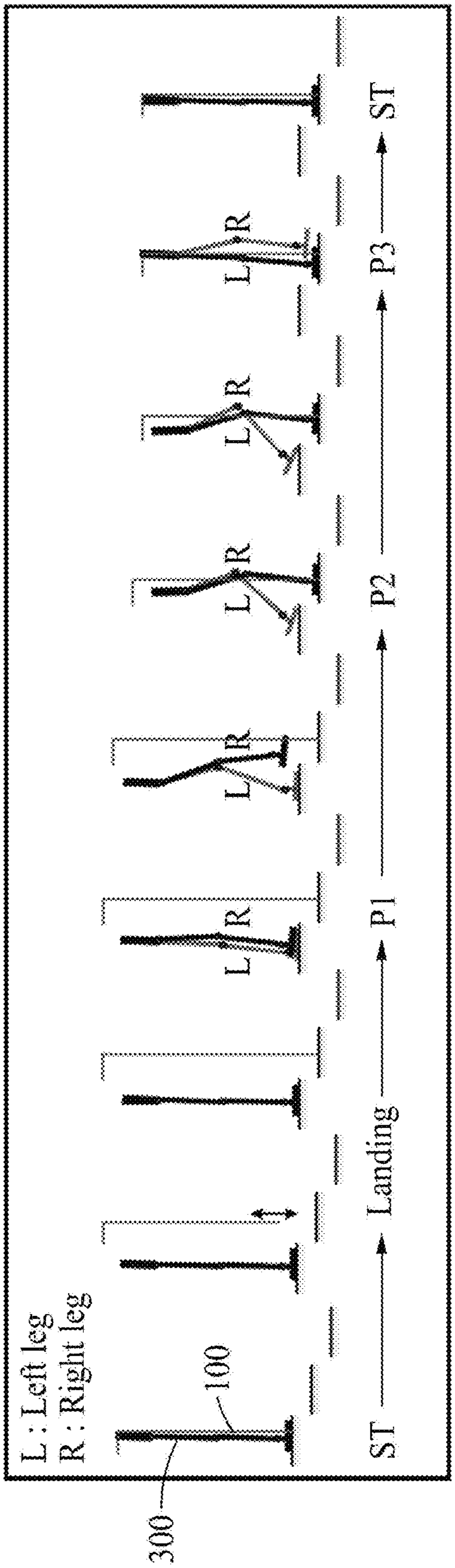
FIG. 6A is a diagram illustrating an example of an operation in which a first walking assistance apparatus assists a user in walking based on a gait motion of the user.

FIG. 6A is a diagram illustrating an example of an operation in which a first walking assistance apparatus assists a user in walking based on a gait motion of the user.

Referring to FIG. 6A, the user 300 may perform a descending walking motion, for example, a walking step-down.

When the user 300 is in a standing state ST before starting the walking step-down, the controller 155 may adjust a length of the connecting body 151 such that the first walking assistance apparatus 100, for example, the upper body support 110 is located at an appropriate position of a body of the user 300.

The user 300 may start the walking step-down in the standing state ST. In this example, a single step of the walking step-down may include a plurality of phases P1 through P3.

The user 300 may step on a ground with a left leg and swing a right leg. When the swinging right leg lands on or contact the ground, a phase may be changed from the phase P1 to the phase P2. In this example, the phase P1 may be a phase in which the user 300 starts a single step of the walking step-down and the phase P2 may be a phase in which the left leg swings and lands on the ground while the right leg stays on the ground.

The controller 155 may adaptively adjust the length of the connecting body 151 based on the phases P1 and P2 of the walking step-down such that the upper body support 110 is located at an appropriate position of the body of the user 300. For example, the controller 155 may lengthen the length of the connecting body 151.

The user 300 may step on the ground with the right leg and swing the left leg. When the swinging left leg lands on the ground, a phase may be changed from the phase P2 to the phase P3. In this example, the phase P3 may be a phase in which the right leg swings and lands on the ground while the left leg stays on the ground. Also, the phase P3 may be a phase in which the user 300 terminates a single step of the walking step-down.

The controller 155 may adaptively adjust the length of the connecting body 151 based on the phases P2 and P3 of the walking step-down such that the upper body support 110 is located at an appropriate position of the body of the user 300.

The user 300 may terminate a single step of the walking step-down in the standing state ST.

Figure 6B:
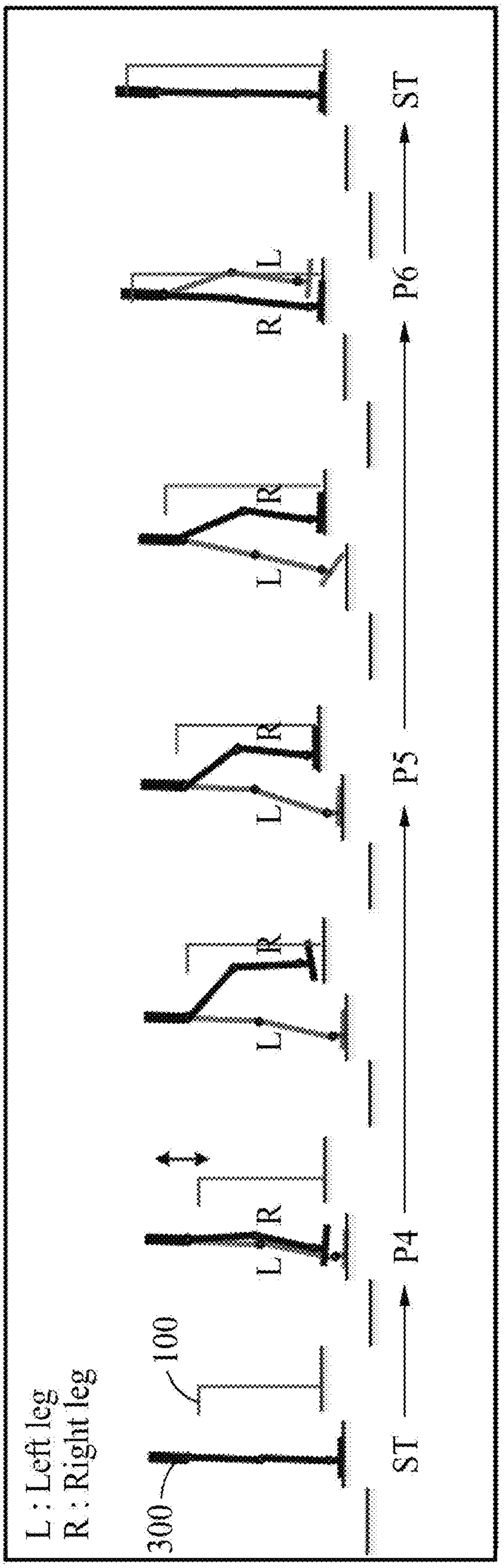
FIG. 6B is a diagram illustrating another example of an operation in which a first walking assistance apparatus assists a user in walking based on a gait motion of the user.

FIG. 6B is a diagram illustrating another example of an operation in which a first walking assistance apparatus assists a user in walking based on a gait motion of the user.

Referring to FIG. 6B, the user 300 may perform an ascending walking motion, for example, a walking step-up.

When the user 300 is in a standing state ST before starting the walking step-up, the controller 155 may adjust a length of the connecting body 151 such that the first walking assistance apparatus 100, for example, the upper body support 110 is located at an appropriate position of a body of the user 300.

The user 300 may start the walking step-up in the standing state ST. In this example, similarly to FIG. 6A, a single step of the walking step-up may include a plurality of phases P4 through P6.

The user 300 may step on a ground with a left leg and swing a right leg. When the swinging right leg lands on or contact the ground, a phase may be changed from the phase P4 to the phase P5. In this example, the phase P4 may be a phase in which the user 300 starts a single step of the walking step-up and the phase P5 may be a phase in which the left leg swings and lands on the ground while the right leg stays on the ground.

The controller 155 may adaptively adjust the length of the connecting body 151 based on the phases P4 and P5 of the walking step-up such that the upper body support 110 is located at an appropriate position of the body of the user 300. For example, the controller 155 may shorten the length of the connecting body 151.

The user 300 may step on the ground with the right leg and swing the left leg. When the swinging left leg lands on the ground, a phase may be changed from the phase P5 to the phase P6. In this example, the phase P6 may be a phase in which the right leg swings and lands on the ground while the left leg stays on the ground. Also, the phase P3 may be a phase in which the user 300 terminates a single step of the walking step-up.

The controller 155 may adaptively adjust the length of the connecting body 151 based on the phases P5 and P6 of the walking step-up such that the upper body support 110 is located at an appropriate position of the body of the user 300.

The user 300 may terminate a single step of the walking step-up in the standing state ST.

Figure 7:
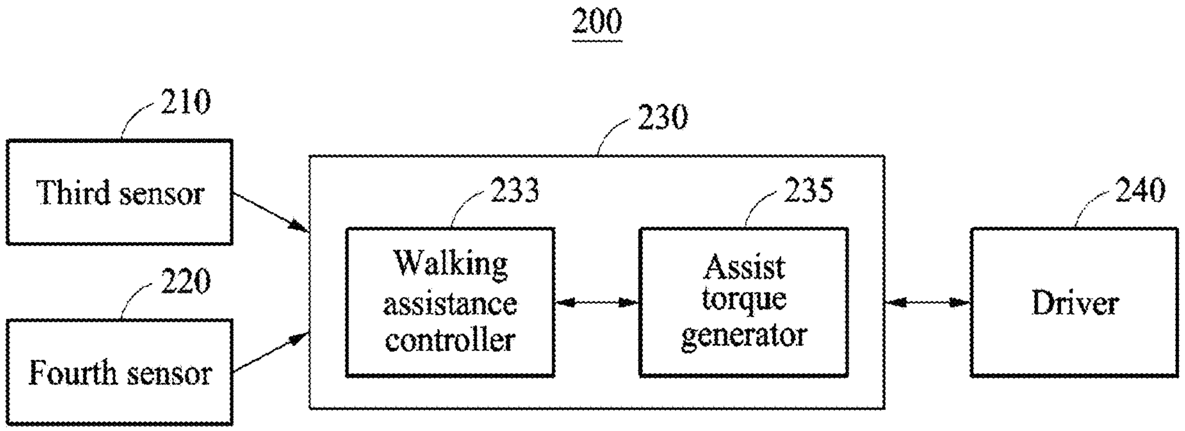
FIG. 7 is a block diagram of a second walking assistance apparatus of FIG. 1.
Figure 8:
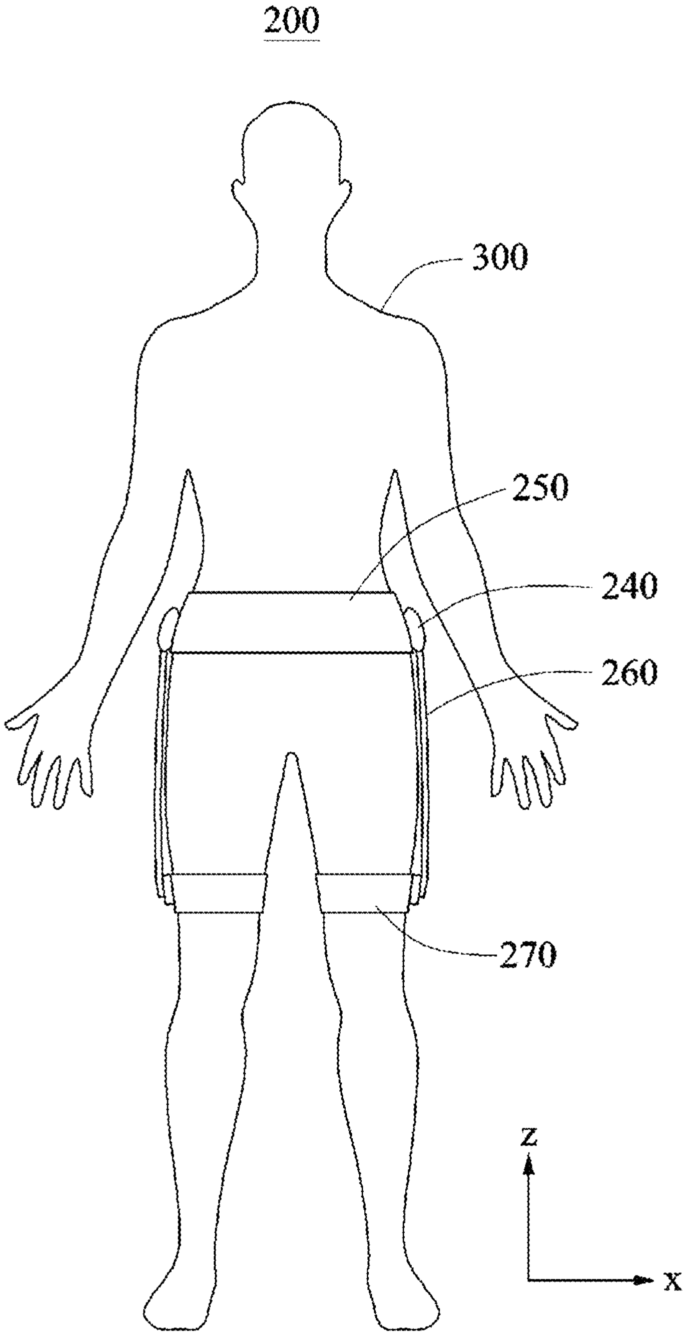
FIG. 8 is a front view of a target body wearing the second walking assistance apparatus of FIG. 1.
Figure 9:
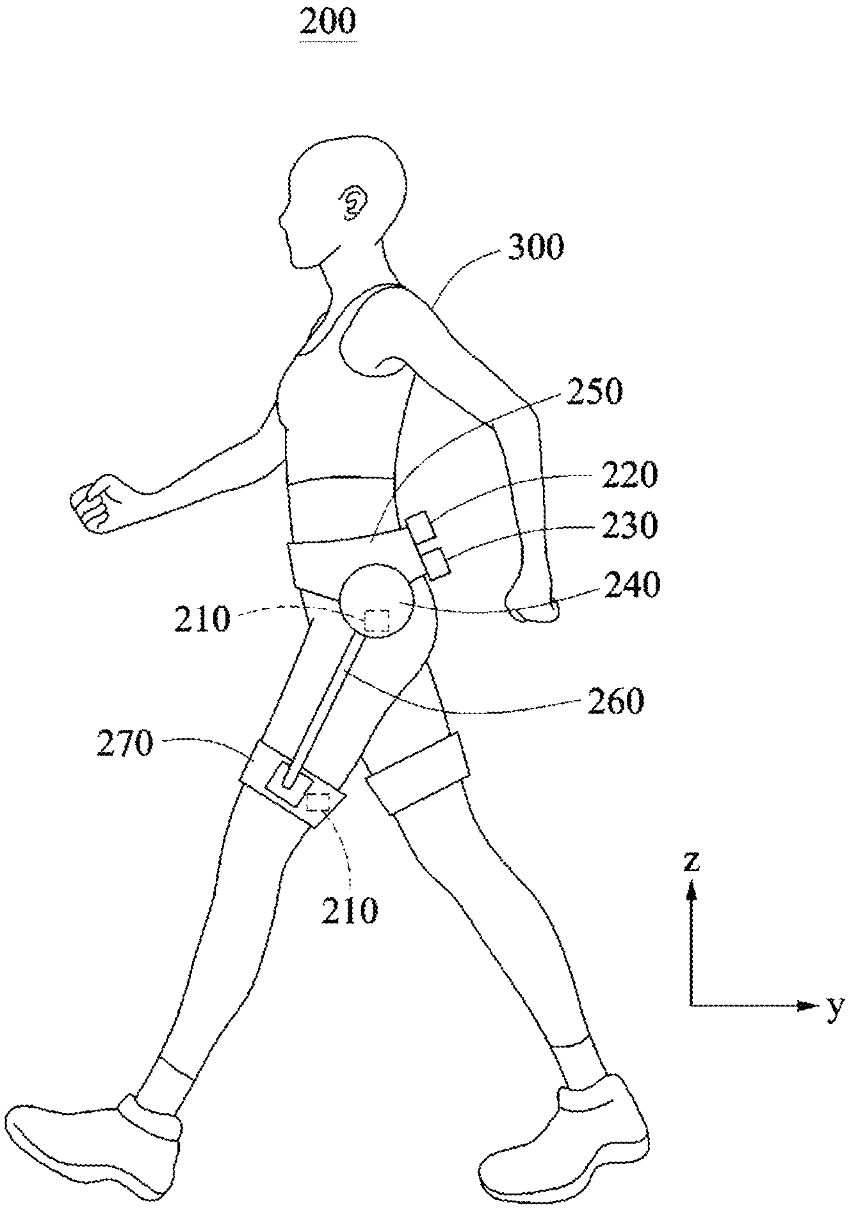
FIG. 9 is a side view of a target body wearing the second walking assistance apparatus of FIG. 1.

FIG. 7 is a block diagram of a second walking assistance apparatus of FIG. 1, FIG. 8 is a front view of a target body wearing the second walking assistance apparatus of FIG. 1, and FIG. 9 is a side view of a target body wearing the second walking assistance apparatus of FIG. 1.

Referring to FIGS. 7 through 9, the second walking assistance apparatus 200 includes a third sensor 210, a fourth sensor 220, a controller 230, and a driver 240. The second walking assistance apparatus 200 may also include a fixing member 250, a force transmitting member 260, and a supporting member 270.

The third sensor 210 may sense both hip joint angular information of the user 300 during a gait. As illustrated in FIG. 9, the third sensor 210 may be included in at least one of the driver 240, the fixing member 250, or the supporting member 270. For example, the both hip joint angular information may include at least one of angles of both hip joints, a difference in the angles of the hip joints, moving directions of the hip joints, and angular velocity information of the hip joints. The third sensor 210 may wired or wirelessly transmit the both hip joint angular information to the controller 230.

The fourth sensor 220 may sense acceleration information and posture information while the user 300 is walking. For example, the fourth sensor 220 may sense at least one of x-axial, y-axial, and z-axial accelerations and x-axial, y-axial, and z-axial angular velocities. The fourth sensor 220 may be, for example, an inertial measurement unit (IMU) sensor. Although FIG. 9 illustrates the fourth sensor 220 implemented or mounted on a waist to which the fixing member 250 is attached, a location of the fourth sensor 220 is not limited thereto. Depending on an example, the fourth sensor 220 may be implemented or mounted, for example, on a shin, a thigh, or an ankle. The fourth sensor 220 may wirelessly or wired transmit the acceleration information and/or the posture information to the controller 230.

The controller 230 included in the second walking assistance apparatus 200 may include any device capable of processing data including, for example, an application application-specific integrated circuit (ASIC) configured to carry out specific operations based on input data, or a microprocessor configured as a special purpose processor by executing instructions included in computer readable code. The computer readable code may be stored on, for example, a memory (not shown). As discussed in more detail below, the computer readable code may configure the controller 230 as a special purpose computer to detect a gait motion of the user 300, and transmit information on the gait motion to the first walking assistance device 100. Further, in some example embodiments, the computer readable code may configure the controller 230 to control the driver 240 to output a force for assisting a gait of the user 300 based on the detected gait motion.

The controller 230 may control an overall operation of the second walking assistance apparatus 200. For example, the controller 230 may control the driver 240 to output a force for assisting a gait of the user 300. The force may indicate, for example, an assistance torque.

The controller 230 may include a walking assistance controller 233 and an assist torque generator 235. For example, the computer readable code, when executed, may configure the controller 233 to perform the operations of the walking assistance controller 233 and the assist torque generator 235.

The walking assistance controller 233 may detect a landing time of a foot of the user 300 based on acceleration information transmitted from the fourth sensor 220. The walking assistance controller 233 may detect the landing time of the foot of the user 300 based on the acceleration information, for example, a vertical acceleration, or a sum of squares of accelerations in an x-axial direction, a y-axial direction, and a z-axial direction corresponding to a vertical direction. Descriptions related to a method of detecting the landing time using the walking assistance controller 233 will also be provided with reference to FIG. 10.

The walking assistance controller 233 may detect a gait motion based on left-and-right hip joint angular information of the user 300 acquired by the third sensor 210 at the landing point in time.

For example, the walking assistance controller 233 may detect the gait motion of the user 300 by comparing the both hip joint angular information of the user 300 to a threshold or based on a preset rule.

Also, the walking assistance controller 233 may detect the gait motion based on a fuzzy logic. For example, the walking assistance controller 233 may detect the gait motion 300 through fuzzification and defuzzification performed on the left-and-right hip joint angular information at the landing point in time of the foot of the user 300. Descriptions related to a method of detecting the gait motion using the fuzzy logic of using the walking assistance controller 233 will also be provided with reference to FIG. 11.

The walking assistance controller 233 may recognize a phase of the gait motion based on the left-and-right hip joint angular information of the user 300 in real time.

The walking assistance controller 233 may transmit information on the gait motion to the controller 155 of the first walking assistance apparatus 100. The information on the gait motion may include, for example, the detected gait motion and the phase of the gait motion.

To provide a gait assistance optimized for each detected or recognized gait motion of the user 300, the walking assistance controller 233 may control the assist torque generator 235 to provide an assist torque profile for a gait assistance of the user 300 based on the gait motion.

The assist torque generator 235 may generate the assist torque profile for the gait assistance of the user 300 based on the gait motion. For example, the assist torque profile may be generated and stored in a memory (not shown) in advance. In this example, the memory may be implemented internally or externally to the assist torque generator 235.

The driver 240 may be disposed on one or more of a left hip portion and a right hip portion of the user 300 to drive one or more of the hip joints of the user 300. The driver 240 may generate an assistance torque to assist the gait of the user 300 under a control of the controller 230, for example, based on the assist torque profile.

The fixing member 250 may be attached to a part, for example, a waist of the user 300. The fixing member 250 may be in contact with at least a portion of an external surface of the user 300. The fixing member 250 may cover along the external surface of the user 300.

The force transmitting member 260 may be disposed between the driver 240 and the supporting member 270 to connect the driver 140 and the supporting member 170. The force transmitting member 260 may transfer the force received from the driver 240 to the supporting member 270. The force transmitting member 260 may be a longitudinal member such as, for example, a wire, a cable, a string, a rubber band, a spring, a belt, or a chain.

The supporting member 270 may support a target part, for example, a thigh of the user 300. The supporting member 270 may be disposed to cover at least a portion of the user 300. The supporting member 270 may apply a force to the target part of the user 300 using the force received from the force transmitting member 260.

Figure 10:
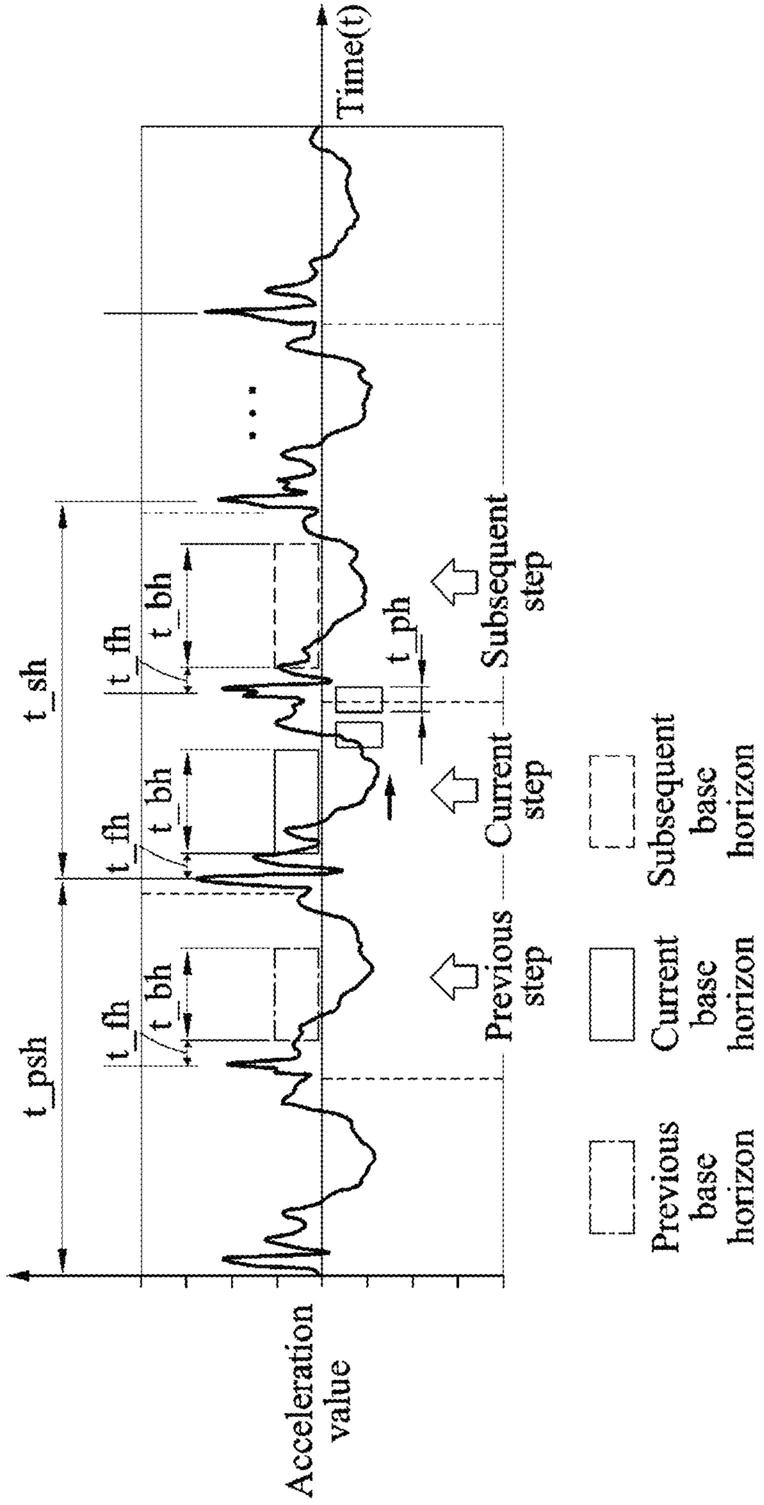
FIG. 10 is a graph representing an operation of detecting a landing point in time using a walking assistance controller of FIG. 7.

FIG. 10 is a graph representing an operation of detecting a landing point in time using a walking assistance controller of FIG. 7.

FIG. 10 illustrates intervals, for example, horizons, used to detect a landing time and an acceleration value acquired in the third sensor 210.

Referring to FIG. 10, t_psh denotes a previous stride horizon, and t_sh denotes a current stride horizon. t_bh denotes a base horizon, t_fh denotes a freeze horizon, and t_ph denotes a prediction horizon.

The base horizon may be a horizon in which a landing time does not occur in a previous step duration horizon. The base horizon may be set to be uniform for each step, or may be updated for each step based on a previous base horizon.

The base horizon may be set to follow the freeze horizon preset from a previous landing time to prevent an error in detection of the landing time after the landing time is detected. Reflecting that a desired time is physically required between the landing time and a subsequent landing time, the prediction horizon may be set to follow the base horizon.

A method of detecting a landing time of a subsequent step using the walking assistance controller 233 based on a current step will be described. A horizon for the current step may be estimated using a horizon for a previous step. When a landing time of the current step is detected, a preset freeze horizon may be set from the landing time. As described above, the freeze horizon may be a horizon preset to prevent an error in detection of the landing time.

To detect the landing time of the subsequent step, the walking assistance controller 233 may compare a mean acceleration for the base horizon to a mean acceleration for a prediction horizon. The freeze horizon preset to prevent an error in detection of the landing time may be set to accurately set the mean acceleration for the base horizon estimated to be a horizon in which a landing time does not occur.

The current base horizon may be set based on a step duration horizon for the previous step. The horizon for the current step may be estimated based on the previous step duration horizon, and the base horizon may be set based on the estimated horizon for the current step.

For example, in detection of the landing time of the current step from the previous step, a difference between a mean acceleration for a previous base horizon and a mean acceleration for an initially set prediction horizon may be less than a threshold value. In this example, the prediction horizon may be shifted to detect the landing time by the walking assistance controller 233.

When a landing time is detected in the shifted prediction horizon, an actual duration horizon for the previous step estimated based on a step previous to the previous step may increase to an extent corresponding to a shifted portion of the prediction horizon. The horizon for the current step may be set based on the actual duration horizon for the previous step. Thus, the current base horizon may be updated to a horizon obtained by adding the shifted portion of the prediction horizon to the previous base horizon.

The prediction horizon may be shifted and set to follow the freeze horizon and the base horizon after the landing time of the current step occurs. The setting may be performed in advance, to allow the difference between the mean acceleration for the base horizon and the mean acceleration for the prediction horizon to be greater than or equal to the threshold value when the landing time occurs while the prediction horizon is minimized.

When the difference between the mean acceleration for the base horizon and the mean acceleration for the prediction horizon is greater than or equal to the threshold value, the walking assistance controller 233 may detect the prediction horizon as the landing time. For example, the walking assistance controller 233 may detect a point in time at which an acceleration is maximized in the prediction horizon as the landing time.

When the difference between the mean acceleration for the base horizon and the mean acceleration for the prediction horizon is less than the threshold value, the walking assistance controller 233 may determine that landing of the foot of the user does not occur in the prediction horizon.

In this example, the walking assistance controller 233 may shift the prediction horizon, and compare a difference between the mean acceleration for the base horizon and a mean acceleration for the shifted prediction horizon to the threshold value. The walking assistance controller 233 may detect the landing time by shifting the prediction horizon until the difference between the mean acceleration for the base horizon and the mean acceleration for the prediction horizon is greater than or equal to the threshold value.

When the landing time of the subsequent step is detected, the walking assistance controller 233 may store a final step duration horizon corresponding to an actual duration horizon for the current step. By storing the final step duration horizon for the current step, the walking assistance controller 233 may estimate a horizon for the subsequent step.

When a landing time of a step subsequent to the subsequent step is to be detected, the walking assistance controller 233 may estimate a duration horizon for the subsequent step through the stored final step duration horizon for the current step. In addition, a subsequent base horizon may also be updated based on the base horizon for the current step and the prediction horizon in which the landing time is detected.

As described above, the base horizon and the mean acceleration for the base horizon may be updated for each step. While the user 300 is walking, a step duration and an acceleration may vary. Thus, the walking assistance controller 233 may update a current base horizon and a mean acceleration for the current base horizon for each step through a previous step duration.

However, when a step duration and an acceleration of the user 300 do not have large deviations for each step, the base horizon and the mean acceleration for the base horizon may be set to be uniform values, thereby reducing a number of computations of the walking assistance controller 233.

In some example embodiments, as described above, the aforementioned walking assistance apparatus 200 supporting a portion of the pelvic limb may not include a foot force sensor and, thus, the landing time may be detected by the walking assistance controller 233.

In other example embodiments, a walking assistance apparatus supporting an entire pelvic limb of the user 300 may include a foot force sensor to detect the landing time of the foot of the user 300. Since the foot force sensor is mounted on a sole in the walking assistance apparatus supporting the entire pelvic limb, the landing time may be readily detected and, thus, the walking assistance controller 233 may not need to detect the landing time.

Figure 11:
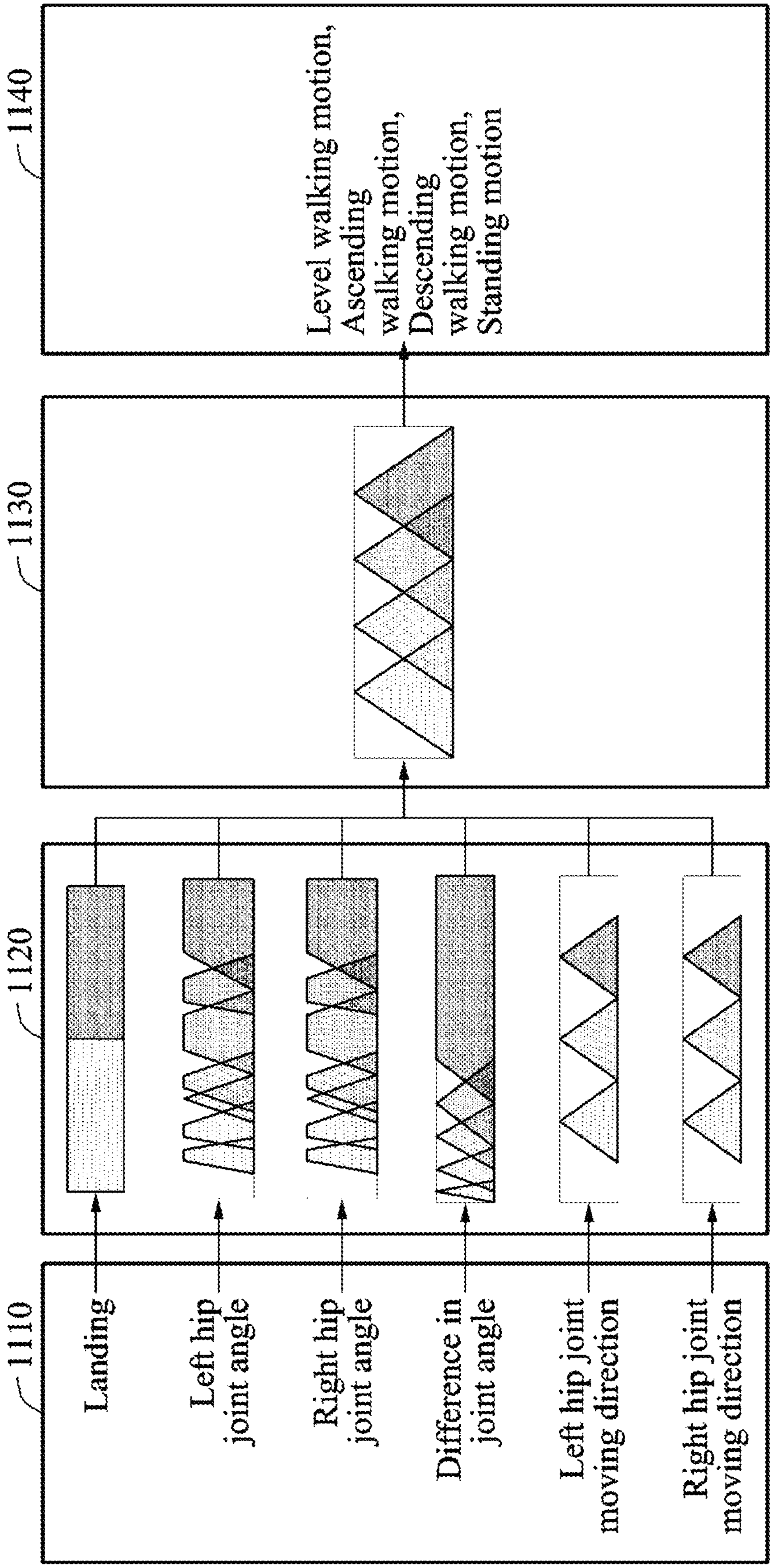
FIG. 11 is a diagram illustrating an operation of detecting a gait motion using the walking assistance controller of FIG. 7.

FIG. 11 is a diagram illustrating an operation of detecting a gait motion using the walking assistance controller of FIG. 7.

Referring to FIG. 11, the walking assistance controller 233 may detect or infer a gait motion based on a fuzzy logic. An input 1110 may include a landing point in time and both hip joint information. The input 1110 may include, as an input parameter, at least one of a landing point in time, an angle of a left hip joint, an angle of a right hip joint, a difference between the angles of both hip joints, a moving direction of the left hip joint, and a moving direction of the right hip joint.

A member function may be previously set for each input 1110. The member function may be set based on a characteristic of each input parameter included in the input 1110.

For example, a member function set for the angle of the left hip joint, among the input parameters, may be classified into ranges of NEMID, NELOW, ZERO, POLOW, POMID, POHIGH, and POVHIGH based on the angle of the left hip joint, and expressed as a membership function. The membership function may indicate a degree of a value of an input parameter belonging to a classified range based on the value of the input parameter.

Similarly to the angle of the left hip joint, a member function corresponding to each of the other input parameters, among the input parameters, may be classified into ranges and expressed as a membership function. However, the foregoing is provided as an example for ease of description, and may be set differently based on a characteristic of each input parameter and a characteristic of a user.

The walking assistance controller 233 may perform fuzzification 1120 on a value of each input parameter through a member function corresponding to each input parameter. The walking assistance controller 233 may obtain a value by performing the fuzzification 1120 on each input parameter based on the member function. Hereinafter, the value obtained through the fuzzification 1120 may also be referred to as, for example, a fuzzified value.

The fuzzified value may correspond to a process of calculating a degree to which the value of each input parameter belongs to each range classified in a member function corresponding to each input parameter. For example, when the angle of the left hip joint is 20°, an input angle of the left hip joint belonging to POLOW by 0.5 and POMID by 0.5 may be expressed by the fuzzified value.

The walking assistance controller 233 may perform defuzzification 1130 based on a preset fuzzy rule and the value obtained by performing the fuzzification 1120 on each input parameter using the member function. The fuzzy rule may be "IF-THEN" rules which are preset based on both hip joint angle information for a level walking motion, an ascending walking motion, a descending walking motion, and a standing motion.

For example, the fuzzy rule may be defined as "IF-THEN" rules as follows.

1. rule: if FootStrike is ON and LeftHipAng is POVHIGH and RightHipAng is POLOW and AbsHipAngDiff is HIGH then WalkMode is STAIRUP
2. rule: if FootStrike is ON and LeftHipAng is POVHIGH and RightHipAng is ZERO and AbsHipAngDiff is HIGH then WalkMode is STAIRUP
3. rule: if FootStrike is ON and LeftHipAng is POMID and RightHipAng is POMID and AbsHipAngDiff is VLOW then WalkMode is STAIRDOWN 4. rule: if FootStrike is ON and LeftHipAng is POMID and RightHipAng is POMID and AbsHipAngDiff is LOW then WalkMode is STAIRDOWN
5. rule: if FootStrike is ON and LeftHipAng is POHIGH and RightHipAng is NELOW and AbsHipAngDiff is HIGH then WalkMode is LEVEL
6. rule: if FootStrike is ON and LeftHipAng is POHIGH and RightHipAng is NEMID and AbsHipAngDiff is VHIGH then WalkMode is LEVEL Rules 1 through 6 may be included in a single fuzzy rule, and may be a fuzzy rule to be used for detecting or inferring a gait motion based on each input parameter to detect or infer the gait motion.

Rule 1 is a rule in which, when a landing point in time is detected, an angle of a left hip joint belongs to POVHIGH, an angle of a right hip joint belongs to POLOW, and a difference between the angles of both hip joints belongs to HIGH, a gait motion is inferred as an ascending walking motion.

Rule 2 is a rule in which, when a landing point in time is detected, an angle of a left hip joint belongs to POVHIGH, an angle of a right hip joint belongs to ZERO, and a difference between the angles of both hip joints belongs to HIGH, a gait motion is inferred as an ascending walking motion.

Rule 3 is a rule in which, when a landing point in time is detected, an angle of a left hip joint belongs to POMID, an angle of a right hip joint belongs to POMID, and a difference between the angles of both hip joints belongs to HIGH, a gait motion is inferred as a descending walking motion.

Rule 4 is a rule in which, when a landing point in time is detected, an angle of a left hip joint belongs to POMID, an angle of a right hip joint belongs to POMID, and a difference between the angles of both hip joints belongs to LOW, a gait motion is inferred as a descending walking motion.

Rule 5 is a rule in which, when a landing point in time is detected, an angle of a left hip joint belongs to POHIGH, an angle of a right hip joint belongs to NELOW, and a difference between the angles of both hip joints belongs to HIGH, a gait motion is inferred as a level walking motion.

Rule 6 is a rule in which, when a landing point in time is detected, an angle of a left hip joint belongs to POHIGH, an angle of a right hip joint belongs to NEMID, and a difference between the angles of both hip joints belongs to VHIGH, a gait motion is inferred as a level walking motion.

The "IF-THEN" rules are provided as an example for ease of description and thus, it is obvious to those skilled in the art that the rules may be set differently depending on a characteristic of a gait motion.

As described above, the walking assistance controller 233 may detect or infer the gait motion of the user by performing the defuzzification 1130 based on the preset fuzzy rule, a range to which each input parameter belongs, and the value obtained by performing the fuzzification 1120 on each input parameter using the member function.

The walking assistance controller 233 may output a gait motion detection result 1140 obtained through the defuzzification 1130. The gait motion detection result 1140 may be classified into the level walking motion, the ascending walking motion, a descending walking motion, and a standing motion, and may be output.

The fuzzy logic is one of representative artificial intelligence technologies for performing deductive inference based on a fuzzy rule. The walking assistance controller 233 may infer the gait motion of the user using the fuzzy logic, thereby detecting the gait motion of the user with a relatively intuitive and robust expression in comparison to a method by a simple threshold value and combination of rules.

Figure 12:
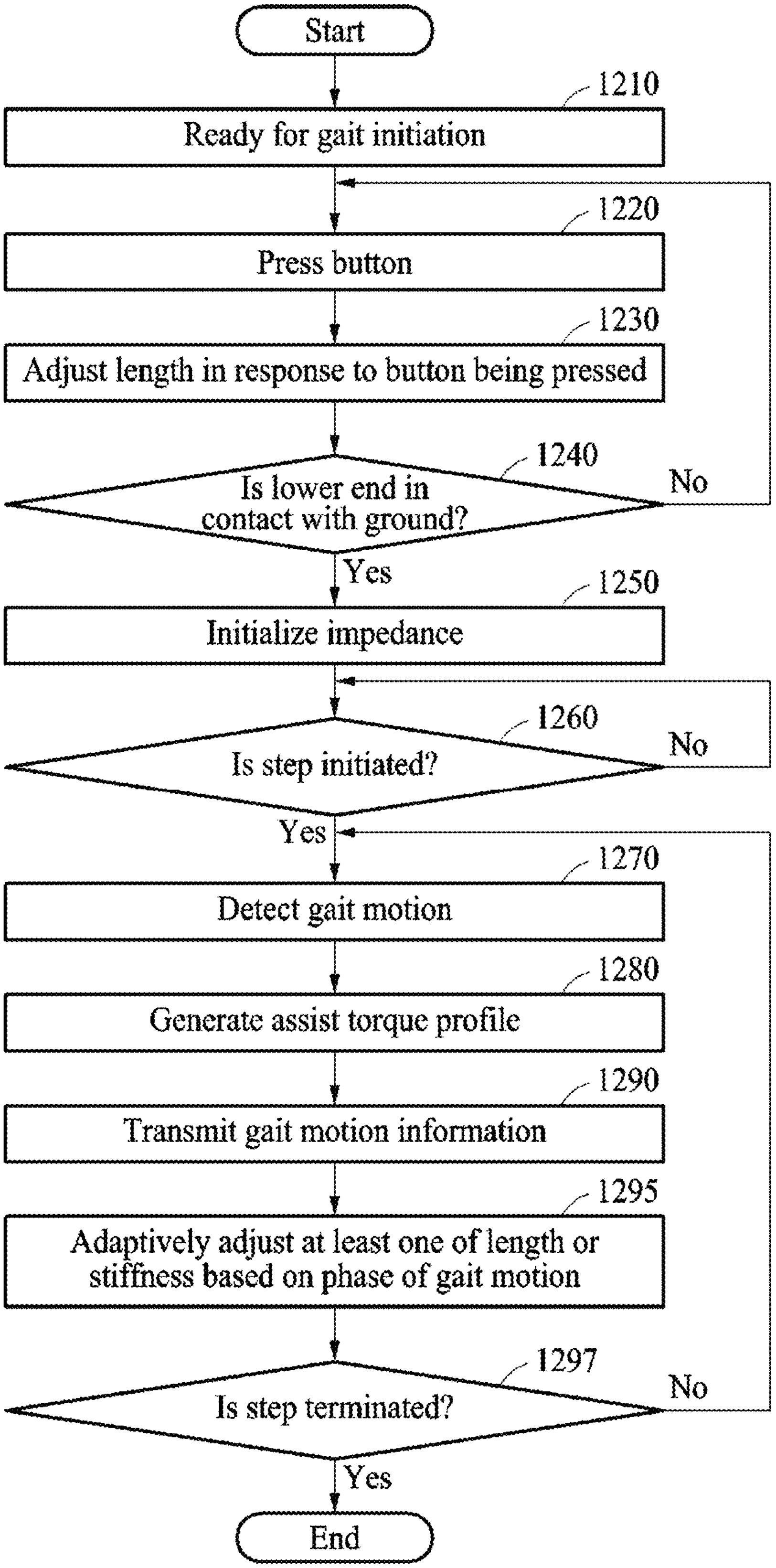
FIG. 12 is a flowchart of an operation method of walking assistance apparatuses of FIG. 1.

FIG. 12 is a flowchart of an operation method of walking assistance apparatuses of FIG. 1. In an example of FIG. 12, it is assumed that the first walking assistance apparatus 100 adjusts a length of the connecting body 151 before a user starts walking in response to a user input received through a button (not shown).

Referring to FIG. 12, in operation 1210, the first walking assistance apparatus 100 may be in a ready state before gait initiation of the user 300.

In operation 1220, the user 300 may press a button of the first walking assistance apparatus 100 before the gait initiation. In operation 1230, the first walking assistance apparatus 100 may adjust the length of the connecting body 151 in response to the button being pressed. For example, the first walking assistance apparatus 100 may determine the initial length based on personalized data for the user 300 stored in a memory (not shown). Alternatively, the user may hold the button until the first walking assistance apparatus 100 reaches a desired initial length.

In operation 1240, the first walking assistance apparatus 100 may determine whether a lower end of the lower body support 130 of the first walking assistance apparatus 100 is in contact with a ground. When the lower end of the lower body support 130 is not in contact with the ground, operations 1220 and 1230 may be performed until the lower end is in contact with the ground. Alternatively, the first walking assistance apparatus 100 may wait at operation 1240 rather than re-performing operations 1120 and 1230. When the lower end of the lower body support 130 is in contact with the ground, in operation 1250, the first walking assistance apparatus 100 may initialize an impedance, for example, a stiffness of the stiffness module 153.

In operation 1260, the second walking assistance apparatus 200 may determine whether the user 300 initiates a gait, for example, a step. The second walking assistance apparatus 200 may determine whether the user 300 initiates a step based on detected gait motion and phase of the gait motion.

When the user 300 initiates a step, in operation 1270, the second walking assistance apparatus 200 may detect a gait motion at a landing point in time based on both hip joint angle information of the user 300.

In operation 1280, the second walking assistance apparatus 200 may generate an assist torque profile for a gait assistance of the user 300 based on the detected gait motion. In operation 1290, the second walking assistance apparatus 200 may transmit, to the first walking assistance apparatus 100, gait motion information including phase information of the gait motion detected based on the both hip joint angle information in real time.

In operation 1295, the first walking assistance apparatus 100 may adaptively adjust at least one of a length or a stiffness based on a phase of the detected gait motion.

In operation 1297, the second walking assistance apparatus 200 may determine whether the user 300 terminates the step. When the step is not terminated, the first walking assistance apparatus 100 and the second walking assistance apparatus 200 may adaptively assist a gait of the user 300 based on a phase of a gait motion detected by repetitively performing operations 1270 through 1295.

As described above, the user 300 may maintain a balance in various gait environments using the first walking assistance apparatus 100 and receive a gait assistance for a lower body from the second walking assistance apparatus 200.

Through this, the user 300 may receive an appropriate gait assistance in various gait environment.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A walking assistance system for assisting a user; the walking assistance system comprising:

a first walking assistance device configured to support a part of an upper body of the user and control a length of the first walking assistance device based on information on a gait motion of the user, the first walking assistance device configured to offload a portion of a body weight of the user by directing a force received from an upper limb of the user to a ground, wherein the first walking assistance device includes at least one support forming a walking stick or a crutch; and a second walking assistance device configured to support a part of a lower body of the user and to transmit the information on the gait motion to the first walking assistance device based on sensing the gait motion of the user.

2. The walking assistance system of claim 1, wherein the gait motion includes at least one of a level walking motion, an ascending walking motion, a descending walking motion, and a standing motion.

3. The walking assistance system of claim 1, wherein the information on the gait motion includes the gait motion and a phase of the gait motion.

4. The walking assistance system of claim 1, wherein the second walking assistance device is configured to detect a landing time of a foot of the user and detect the gait motion based on left-and-right hip joint angle information of the user at the landing time.

5. The walking assistance system of claim 1, wherein the first walking assistance device comprising:

an upper body support configured to support the part of the upper body of the user; and a lower body support configured to contact the ground on which the user is standing to support the user;

a connecting body configured to connect the upper body support and the lower body support; and at least one processor configured to control the length of the first walking assistance device by adjusting a length of the connecting body based on the information on the gait motion.

6. The walking assistance system of claim 5, wherein the part of the upper body includes at least one of a hand, an arm or an underarm of the user.

7. The walking assistance system of claim 5, wherein the at least one processor is configured to control the length of the connecting body such that the first walking assistance device is at a set height relative to the user based on whether the lower body support is in contact with the ground and a distance between the lower body support and the ground.

8. The walking assistance system of claim 5, wherein the first walking assistance device further comprises:

a stiffness module having a stiffness that is adjustable to assist a supporting power of the user.

9. The walking assistance system of claim 8, wherein the at least one processor is configured to control the stiffness of the stiffness module by adjusting a damper constant or a spring constant of the stiffness module based on the information on the gait motion.

10. A method of operating a walking assistance system including a first walking assistance device and a second walking assistance device, the first walking assistance device configured to offload a portion of a body weight of a user by directing a force received from an upper limb of the user to a ground, the method comprising:

transmitting, by the second walking assistance device, information on a gait motion based on sensing the gait motion of the user; and controlling, by the first walking assistance device, a length of the first walking assistance device based on the information on the gait motion, wherein the first walking assistance device includes at least one support forming a walking stick or a crutch and is configured to support a part of an upper body of the user, and wherein the second walking assistance device is configured to support a part of a lower body of the user.

11. The method of claim 10, wherein the gait motion includes at least one of a level walking motion, an ascending walking motion, a descending walking motion, and a standing motion.

12. The method of claim 10, wherein the information on the gait motion includes the gait motion and a phase of the gait motion.

13. The method of claim 10, further comprising:

detecting, by the second walking assistance device, landing time of a foot of the user; and detecting, by the second walking assistance device, the gait motion based on left-and-right hip joint angle information of the user at the landing time.

14. The method of claim 10, further comprising:

assisting, by the second walking assistance device, the lower body of the user based on the gait motion while the user is walking.

15. The method of claim 10, further comprising:

Controlling, by the first walking assistance device before the user starts walking, the length of the first walking assistance device such that the first walking assistance device is at a set height relative to the user based on whether the first walking assistance device is in contact with the ground and a distance between the first walking assistance device and the ground.

16. The method of claim 10, further comprising:

controlling, by the first walking assistance device, a stiffness of the first walking assistance device based on the information on the gait motion.

* * * * *